United States Patent [19]

Moody et al.

[11] Patent Number: 5,235,630

[45] Date of Patent: Aug. 10, 1993

[54] EMERGENCY CALL STATION IDENTIFICATION SYSTEM AND METHOD

[75] Inventors: Martin Moody, Inver Grove Heights; Donald Madson, Shoreview; Gordan Osgood, Starbuck, all of Minn.

[73] Assignee: Telident, Incorporated, Minneapolis, Minn.

[21] Appl. No.: 686,492

[22] Filed: Apr. 17, 1991

[51] Int. Cl.⁵ .................. H04M 11/04; H04M 3/42
[52] U.S. Cl. .................. 379/37; 379/45; 379/49; 379/201
[58] Field of Search ............. 379/37, 45, 49, 39–44, 379/201

[56] References Cited

U.S. PATENT DOCUMENTS

| | | | |
|---|---|---|---|
| 2,195,627 | 4/1940 | Lomax et al. | 379/45 |
| 2,889,402 | 6/1959 | Pearsal, Jr. | |
| 3,881,060 | 4/1975 | Connell et al. | 379/45 |
| 4,052,569 | 10/1977 | Pirnie, III | 379/45 |
| 4,071,699 | 1/1978 | Jovic et al. | 379/142 |
| 4,260,859 | 4/1981 | Aaroen | 379/2 |
| 4,310,726 | 1/1982 | Asmuth | 379/45 |
| 4,591,665 | 5/1986 | Foster et al. | 379/142 |
| 4,623,760 | 11/1986 | Blinkerd et al. | 379/232 |
| 4,656,624 | 4/1987 | Collins et al. | 379/265 |
| 4,680,776 | 7/1987 | Ikeuchi et al. | 340/825.01 |
| 4,893,325 | 1/1990 | Pankonen et al. | 379/45 |
| 4,924,491 | 5/1990 | Compton et al. | 379/201 |
| 5,161,180 | 11/1992 | Chavous | 379/45 |

*Primary Examiner*—James L. Dwyer
*Assistant Examiner*—Jason Chan
*Attorney, Agent, or Firm*—Lawrence M. Nawrocki

[57] ABSTRACT

A device for identifying a specific station, among a plurality of geographically-dispersed stations represented by a common phone number and serviced by a common PBX, which has initiated an emergency "9-1-1" telephone call. The specific station having initiated the call is identified to the appropriate public safety answering point (PSAP) which is connected in an enhanced "9-1-1" emergency call network. Typically, the PSAP and PBX have different protocols. The device functions to convert the protocol of the PBX to the protocol of the emergency call network. Further, it assigns an arbitrary designation representing the specific station identified as having initiated the emergency call. Further, the invention transmits the arbitrary designation to the appropriate PSAP for responding to the call.

7 Claims, 2 Drawing Sheets

EMERGENCY CALL STATION IDENTIFICATION SYSTEM AND METHOD

TECHNICAL FIELD

The present invention deals broadly with the field of telecommunications. More specifically, however, it deals with technologies related to public switched telephone networks (PSTN) and, even more specifically, structures for identifying a particular station, among a plurality of stations serviced by a private branch exchange (PBX), initiating a "9-1-1" emergency call. The focus of the invention is the identification of the particular station and transmission of information to a public safety answering point (PSAP) so that the PSAP can call back to the station initiating the call and process information provided in order to specifically identify location of the station initiating the call.

BACKGROUND OF THE INVENTION

In the early days of telecommunications, so few telephones existed that, when an individual received a telephone call, he or she almost knew where it was coming from before answering. As telephone systems have developed, however, it has come to be that there is scarcely a home, apartment, or condominium that does not have a telephone. Certainly, the telephone has come to be an essential item in a residence and not merely a luxury.

The situation is more acute when one considers the exigencies involved in a business scenario. Conditions now dictate that more business is done by the telephone than in face-to-face encounters. It is extremely difficult to imagine a successful business not having multiple lines available so that in-coming calls are substantially always able to get through. This is the case even in instances of very small businesses.

In the case of very large businesses, not only are there multiple stations serviced by a common PBX to make extensions available to many employees, but it is frequently the case that a common PBX covers far-flung facilities. For example, a large multi-national company might have a manufacturing facility in a particular geographic area and a stocking warehouse which, while in the same general geographic location, is at some distance from the manufacturing facility. Stations in both the manufacturing facility and the stocking warehouse, however, might be serviced by the same PBX.

In the relatively recent past, the United States has implemented an enhanced "9-1-1" emergency call system. Such systems function to identify a number initiating such an emergency call so that, if the person making the call is emotionally agitated or unable to talk for a long period of time because, for example, of a spreading fire, and does not, as a result, identify the specific station from which he is calling, the public safety answering point (PSAP) to which the call has been routed will be unable to fully respond in an appropriate manner because of the multiplicity of stations serviced by the common PBX. It might be necessary, however, for the PSAP, in some circumstances, to call back. For example, while the caller might identify the emergency as a fire emergency, it may be unclear as to whether ambulance and paramedic services need to be dispatched. Certainly, fire fighting vehicles and police would be dispatched, but to dispatch an ambulance or ambulances when there is neither injury nor any danger of injury would be an inappropriate utilization of resources. In fact, one can envision circumstances wherein someone else needing ambulance services might not have them available because of the inappropriate dispatching of an ambulance or ambulances when they are not necessary at the location to which they have been sent.

Under "9-1-1" emergency systems currently in use, an individual at the PSAP would be able to identify the PBX from which the call was initiated. As previously discussed, however, the facilities serviced by the PBX might be at far-flung locations. In fact, because of the inability to identify a particular station from which the call was initiated, the call might be routed to an incorrect PSAP. In the case of a large, dispersed-facility entity, the emergency services might be routed to the company headquarters. The emergency might actually be occurring, however, at a facility some distance from the headquarters. As will be understood, in the case of many emergencies, being timely and delivering the services would be essential and even a matter of "life and death".

If a person manning the PSAP incoming line were able to identify the calling station, or at least a station immediately proximate the calling station, the necessary service could be routed to the appropriate station or a designated control station that would be aware of the emergency. If the individual at the PSAP were able to identify a "call back" number corresponding to the call-initiating station, he or she would be able to get back to the calling station in a case when sufficient information was not originally elicited as to the type of emergency occurring. A determination could then be made as to what facilities should be dispatched.

Conventional telephone systems employ a public switched telephone network (PSTN) which is, typically, owned by the local telephone company. On the other hand, people or companies subscribing to particular telephone numbers, typically, own their own equipment. In the case of a company having multiple stations, a subscriber purchases a private branch exchange (PBX) console along with hand sets to be maintained at each station. The individual station handsets are interfaced with the PBX console, the console, in turn, being interfaced with the PSTN. Typically, this interfacing of the PBX with the PSTN occurs through a Central Office (CO).

It is frequently true that the protocol employed by the particular PBX equipment purchased by the user from a commercial manufacturer is different from the protocol of the emergency network. Harmonization of these protocols can present problems in identifying the particular station, of the many stations serviced by a PBX, initiating an emergency call. If harmonization does not properly occur, identification of the station initiating the call, or of a monitoring station responsible for the initiating station, will not occur.

A further problem that might be encountered in identifying a station initiating an emergency call is the development of a problem in a trunk interconnecting a station identification module to a switching tandem in the emergency network. Certainly, it would be undesirable if the first anyone became aware of the development of a problem was when an emergency call were initiated. It is virtually essential, therefore, that some means for monitoring the integrity of trunks be provided and that monitoring be able to be accomplished prior to the initiating of an emergency call.

It is to these problems and dictates of the prior art that the present invention is directed. It is a system which identifies a station initiating an emergency call, or a station responsible for the initiating station, which harmonizes the protocol of the PBX and that of the emergency network, and which monitors the integrity of trunks between the module and a switching tandem.

SUMMARY OF THE INVENTION

The present invention is a device for identifying a specific hand set station of a plurality of stations of a telephone system serviced by a private branch exchange (PBX), which has initiated a "9-1-1" emergency telephone call. The identification is transmitted to an appropriate public safety answering point (PSAP) which is connected in an enhanced "9-1-1" emergency call network. The enhanced "9-1-1" emergency call network has a first protocol, and the PBX has a different protocol. The apparatus invention includes means by which the PBX protocol is converted to the protocol of the emergency call network. Means are also included for assigning a phone number representing a station identified as having initiated the "9-1-1" emergency call, and for transmitting the phone number to the appropriate (PSAP).

In one embodiment of the invention, the converting means and assigning and transmitting means, together, comprise a unitary module. Typically, such a module would be disposed geographically proximate the PBX.

Another embodiment employs a module wherein micro-processor means are employed. Such microprocessor means function to control the means by which the PBX protocol is converted to the emergency call network protocol, and to control the assigning and transmitting means.

In some applications in which the present invention is used, the identification of the station initiating the "9-1-1" emergency call is transmitted to the PSAP through a switching tandem. When the invention functions in such an application, the assigning and transmitting means can include at least one trunk extending from the module, aggregately comprising the converting means and the assigning and transmitting means, to the switching tandem. In a preferred embodiment, when such a trunk is employed, the invention can further include means for ascertaining the integrity of the trunk prior to the placement of an emergency call.

The invention also includes methods. Broadly, the invention encompasses a method for harmonizing the protocol of a PBX, which services a plurality of stations, with the protocol of an enhanced "9-1-1" emergency call network. In the application of the method, the PBX is provided with a plurality of connections and a switching tandem of the emergency call network is also provided with a plurality of connections. The method invention includes the steps of providing a harmonization module having a first plurality of connections corresponding in type and number to the connections of the PBX, and a second plurality of connections, corresponding in type and number to the connections of the switching tandem; interconnecting the connections of the PBX with the corresponding first plurality of connections of the harmonization module by employment of a plurality of tie-line interconnections; interconnecting the connections of the switching tandem with the corresponding second plurality of connections of the harmonization module by employment of a plurality of trunk interconnections; exercising a connection of the PBX in response to transmission of a signal indicative of initiating of an emergency call by one of the stations serviced by the PBX; sensing the exercise of the PBX connection at the corresponding connection of the harmonization module; acknowledging to the PBX by the harmonization module the communication received from the PBX; seizing a trunk interconnecting a connection of said harmonization module and a corresponding connection of the switching tandem; causing the switching tandem to respond to the harmonization module; sensing the response of the switching tandem at the harmonization module; and relaying existence of the response condition to the PBX.

In a preferred method embodiment, additional steps can also be employed. For example, the following steps can also be included: transmitting from the PBX identification information regarding a station serviced by the PBX which has initiated a "9-1-1" emergency call to the harmonization module; translating the information to a phone number representative of the station; transmitting the phone number to the switching tandem; acknowledging to the harmonization module receipt of the phone number by the switching tandem; acknowledging to the PBX receipt of the phone number by the switching tandem; defining a voice path from the PBX to the switching tandem; and monitoring discontinuation of the voice path. If desired, a step of transmitting network call directing information to the switching tandem can be inserted after the step of transmitting from the PBX identification information regarding a station serviced by the PBX which has initiated a "9-1-1" emergency call to the harmonization module.

The invention, thus, includes both apparatus and methods which function to perform the processes described above. More specific features of the invention and advantages obtained in view of those features will become apparent with reference to the Detailed Description of the Invention, appended claims, and accompanying drawings figures.

DETAILED DESCRIPTION OF THE INVENTION

Figure 1:
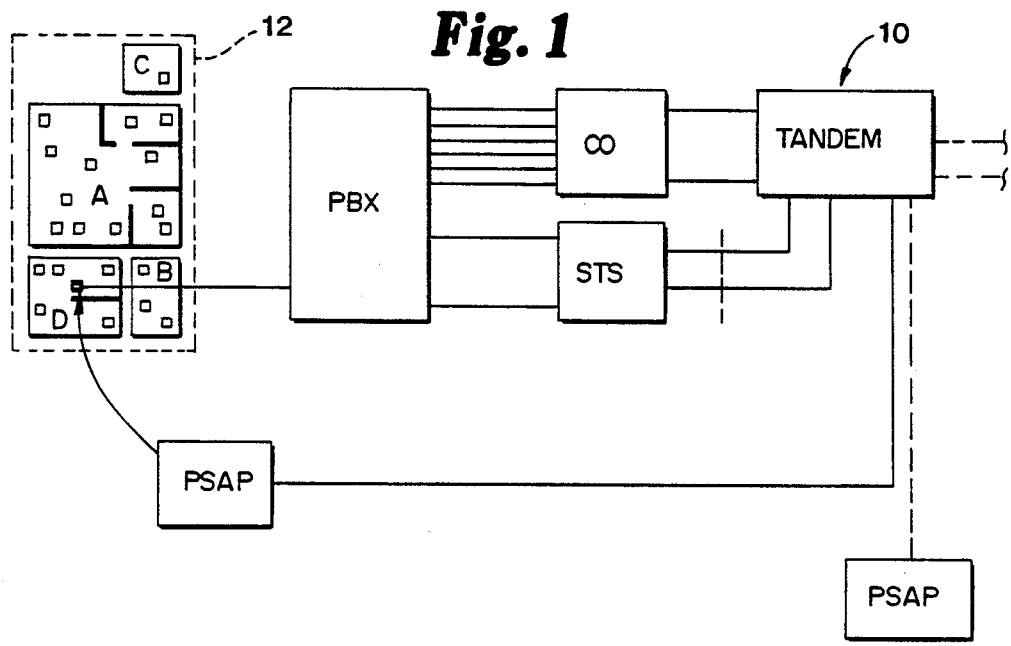
FIG. 1 is a schematic diagram illustrating a network implementing the present invention.

Referring now to the drawings wherein like reference numerals and reference letters denote like elements throughout the several views, FIG. 1 illustrates a system 10, including various components of a public switched telephone network (PSTN), in which a station translation system (STS) module in accordance with the present invention is also employed. A dotted line illustrates, and is representative of, a facility 12, a plurality of stations of which are serviced by a common pilot number.

As seen in FIG. 1, the facility 12 can include multiple locations or functions which are represented by reference letters A, B, C, and D. It will be understood that, while these locations or functions are illustrated schematically as being adjacent one another, they can, and very commonly are, geographically remote from one another. Each location or function is illustrated as having a plurality of stations therein.

Depending upon the particular type of telephone system purchased by the facility, the telephone customer will have a particular type of private branch exchange (PBX) console into which the various stations of all of the locations or functions are inputted. While the PBX console illustrated in FIG. 1 is not enclosed within the dotted line surrounding the locations or functions, the PBX console will, in fact, be on-site.

It is a function of the module in accordance with the present invention, when an emergency call is initiated, to convert the protocol of the PBX console to the protocol of the emergency call network which is a part of the PSTN. It is intended, therefore, that the STS module will be on-site also.

The emergency call network may include a central office (CO) and a switching tandem. One or more lines interconnect the PBX and the CO, and trunks are provided between the CO and the switching tandem, if one is employed.

FIG. 1 also illustrates a pair of public safety answering points (PSAPs). A plurality of PSAPs may be employed for receiving emergency 9-1-1 telephone calls. FIG. 1 illustrates only two PSAPs. It will be understood, however, that a multiplicity of such answering points would, typically, be in a telephone system.

FIG. 1 illustrates a pair of tie-lines interconnecting the PBX console and the STS module. When an emergency 9-1-1 call is initiated by a station serviced by the PBX, the PBX console will route the call through one of these tie lines to the STS module. The STS module, in turn, functions to identify the particular station, or a monitoring station immediately proximate the station initiating the call, assign a phone number representing a station identification, convert the PBX protocol to that of the emergency call network, and transmit the phone number to the switching tandem, if employed, for further transmission to the appropriate PSAP. Multiple trunks are provided interconnecting the STS module and the switching tandem for transmission of information after the protocol is converted. FIG. 1 illustrates, in solid line, the path of assignment and transmission to the appropriate PSAP. If a party initiating a 9-1-1 emergency call abruptly hangs up, the PSAP to which the call has been routed can, in view of the appropriate station having been identified, call back for additional necessary information.

Figure 2:
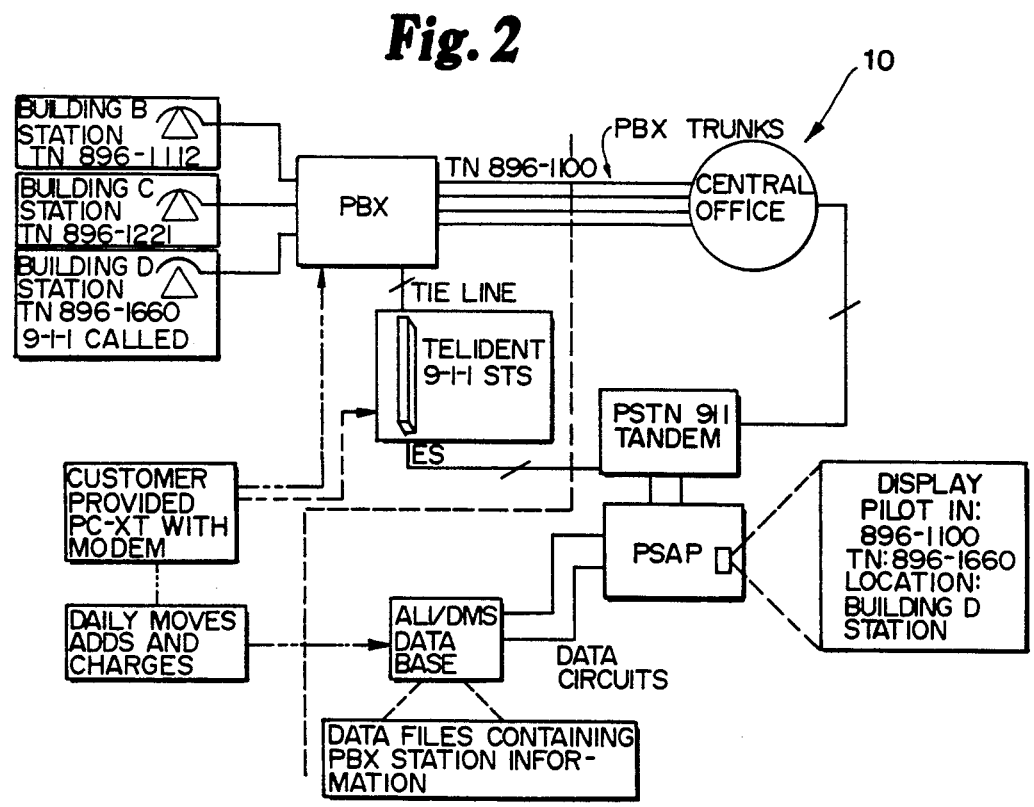
FIG. 2 is a schematic diagram more specifically illustrating a routing flow path.

FIG. 2 illustrates, more specifically, the various components of the system. A dotted line running generally vertically through the figure segregates on-site components from those off-site. The components generally to the left of the dotted line would be on-site, while those to the right would be off-site.

FIG. 2 illustrates a situation wherein a station located within the control of location or function D has initiated a 9-1-1 emergency call. The call is routed via a tie-line, alternative to the normal PBX lines to the CO, to the STS module. Again, the STS module effects identification of the originating station of the emergency call, harmonizes the protocol of the PBX console with that of the emergency call network, and completes a path, through a trunk, to the switching tandem. The call is then routed to the appropriate PSAP.

FIG. 2 also illustrates input from the customer to an ANI/ALI database. For example, daily moves, adds, and changes are inputted to an automatic number identification (ANI)/automatic location identification (ALI) database. The database, in turn, provides location information to the PSAP to facilitate response to a 9-1-1 emergency call.

Figure 3:
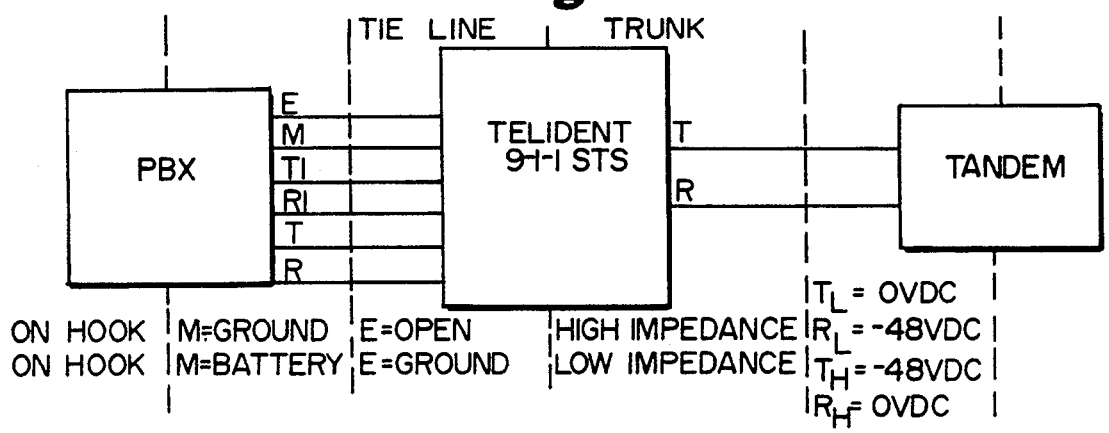
FIG. 3 is a schematic portrayal of the interface between a private branch exchange (PBX) console, a harmonizing module in accordance with the present invention, and a switching tandem of a public switched telephone network (PSTN).

The methodology (that is, the sequencing of events) of the system, as accomplished including the employment of the STS module, will now be described with reference to FIG. 3. A station (for example, a station at location or function D) initiates a 9-1-1 emergency call. The station is identified by the PBX and is represented in dual-tone, multi-frequency or other appropriate protocol. The PBX seizes a tie-line to the STS module. An "M" lead of a tie-line, as illustrated in FIG. 3, is exercised by the PBX. This initiation of the emergency system through the STS module conversion unit commences action as will be discussed hereinafter.

The PBX exercises the M lead of the tie-line. This is detected by the STS module. Such an exercising of the M lead is deemed to be a request to communicate.

When the PBX exercises the M lead, the PBX is said to go off-hook. It is in response to this going off-hook that a trunk from the STS to the tandem is seized.

FIG. 3 illustrates a pair of lines between the STS and the switching tandem. These are labelled T, for tip, and R, for ring. In response to a seizure of a tie-line by the STS module, the tandem, after a defined period of time, normally provides a "wink" back to the STS. The STS in response exercises the E lead at the PBX.

This initial sequence of events establishes that the system is ready for operation. The system is then in condition for further functioning as will be discussed hereinafter.

With the system so disposed, station identification is transmitted via the tie-lines from the PBX to the STS. The T, R, T1, and R1 paths illustrated in FIG. 3 function for transmission of information with respect to station identification information as well as voice transmission path. The E and M leads, on the other hand, are control paths to dispose the system for station identification transmission information and voice transmission.

The T, R, T1, and R1 paths effect transmission of station identification in a dual-tone multi-frequency (DTMF) protocol. This protocol is a protocol employed by touch-tone telephones. Conversion of this protocol to a multi-frequency (MF) protocol is effected by the STS.

As previously indicated, it has already been ascertained at this point that the trunk from the STS to the switching tandem is in a functioning mode. The STS then sends appropriate call directing information. This identification serves to signal to the tandem that a 9-1-1 emergency call is to be transmitted. With this transmission from the STS to the tandem, the tandem, in turn, sends a steady off-hook signal back.

As this has been occurring, the STS, during a defined time period, has been waiting for station identification information from the PBX. The PBX would, typically, transmit a number, representative of the station identification, which is, typically, less than seven digits. The STS then translates, based upon information provided to a microprocessor in the STS, to a seven-digit telephone number. This seven-digit number is, typically, a dialable number. The seven-digit number, known as ANI, is then transmitted to the tandem for relay to the appropriate PSAP.

The E lead at the PBX is then exercised by the STS. Such exercising prompts the PBX to complete a voice path.

The present invention also provides means for monitoring trunks to ensure their integrity and availability. Typically, the switching tandem has at least two trunks coming from the STS. A measure of redundancy is, thereby, provided. As a result, protection is afforded if a trunk is legitimately busy or is not responding properly. The PBX is provided with sufficient intelligence to change over to a different out-going tie-line which co-operates with an available functional trunk.

This monitoring is accomplished, and, if such is the case, a defective trunk is ascertained and brought to the attention of the appropriate personnel prior to the initiation of a 9-1-1 emergency call. Monitoring ascertains incorrect trunk electrical characteristics and/or incorrect protocol responses. The problem can be communicated to appropriate personnel, for example, by the tripping of an alarm.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for harmonizing the protocol of a private branch exchange (PBX), servicing a plurality of stations, with the protocol of an enhanced "9-1-1" emergency call network, wherein the PBX is provided with a plurality of connections, and wherein a switching tandem of the emergency call network is also provided with a plurality of connections, comprising the steps of:
   (a) providing a harmonization module having a first plurality of connections corresponding in type and number to the connections of the PBX, and a second plurality of connections, corresponding in type and number to the connections of the switching tandem;
   (b) interconnecting the connections of the PBX with the corresponding first plurality of connections of said harmonization module by employment of a plurality of tie-line interconnections;
   (c) interconnecting the connections of the switching tandem with the corresponding second plurality of connections of said harmonization module by employment of a plurality of trunk interconnections;
   (d) exercising a connection of the PBX in response to transmission of a signal indicative of initiating of an emergency call by a specific station serviced by the PBX;
   (e) sensing the exercise of the PBX connection at the corresponding connection of the harmonization module;
   (f) seizing a trunk interconnecting a connection of said harmonization module and a corresponding connection of the switching tandem;
   (g) causing the switching tandem to respond to said harmonization module;
   (h) sensing the response of the switching tandem at the harmonization module; and
   (i) relaying existence of the response of the switching tandem to the PBX.

2. A method in accordance with claim 1 further comprising the steps of:
   (j) transmitting from the PBX specific identification information regarding the station serviced by the PBX which has initiated a "9-1-1" emergency call to the harmonization module;
   (k) translating the information to an arbitrary designation representative of the specific station; and
   (l) transmitting the arbitrary designation to the switching tandem.

3. A method in accordance with claim 2 further comprising the steps of:
   (m) acknowledging to the harmonization module receipt of the arbitrary designation by the switching tandem; and
   (n) acknowledging to the PBX receipt of the arbitrary designation by the switching tandem.

4. A method in accordance with claim 3 further comprising the step of:
   (o) defining a voice path from the PBX to the switching tandem.

5. A method in accordance with claim 4 further comprising the step of:
   (p) monitoring discontinuation of the voice path.

6. A method in accordance with claim 2 further comprising a step, after performance of step (j), of transmitting network call directing information to the switching tandem.

7. A method for harmonizing the protocol of a private branch exchange (PBX), servicing a plurality of stations, with the protocol of an enhanced "9-1-1" emergency call network, wherein the PBX is provided with a plurality of connections, and wherein a receiving apparatus of the emergency call network is also provided with a plurality of connections, comprising the steps of:
   (a) providing a harmonization module having a first plurality of connections corresponding in type and number to the connections of the PBX, and a second plurality of connections, corresponding in type and number to the connections of the receiving apparatus;
   (b) interconnecting the connections of the PBX with the corresponding first plurality of connections of said harmonization module by employment of a plurality of tie-line interconnections;
   (c) interconnecting the connections of the receiving apparatus with the corresponding second plurality of connections of said harmonization module by employment of a plurality of trunk interconnections;
   (d) exercising a connection of the PBX in response to transmission of a signal indicative of initiating of an emergency call by a specific station serviced by the PBX;
   (e) sensing the exercise of the PBX connection at the corresponding connection of the harmonization module;
   (f) seizing a trunk interconnecting a connection of said harmonization module and a corresponding connection of the receiving apparatus;
   (g) causing the receiving apparatus to respond to said harmonization module;
   (h) sensing the response of the receiving apparatus at the harmonization module; and
   (i) relaying existence of the response of the receiving apparatus to the PBX.

* * * * *